Figure 1:
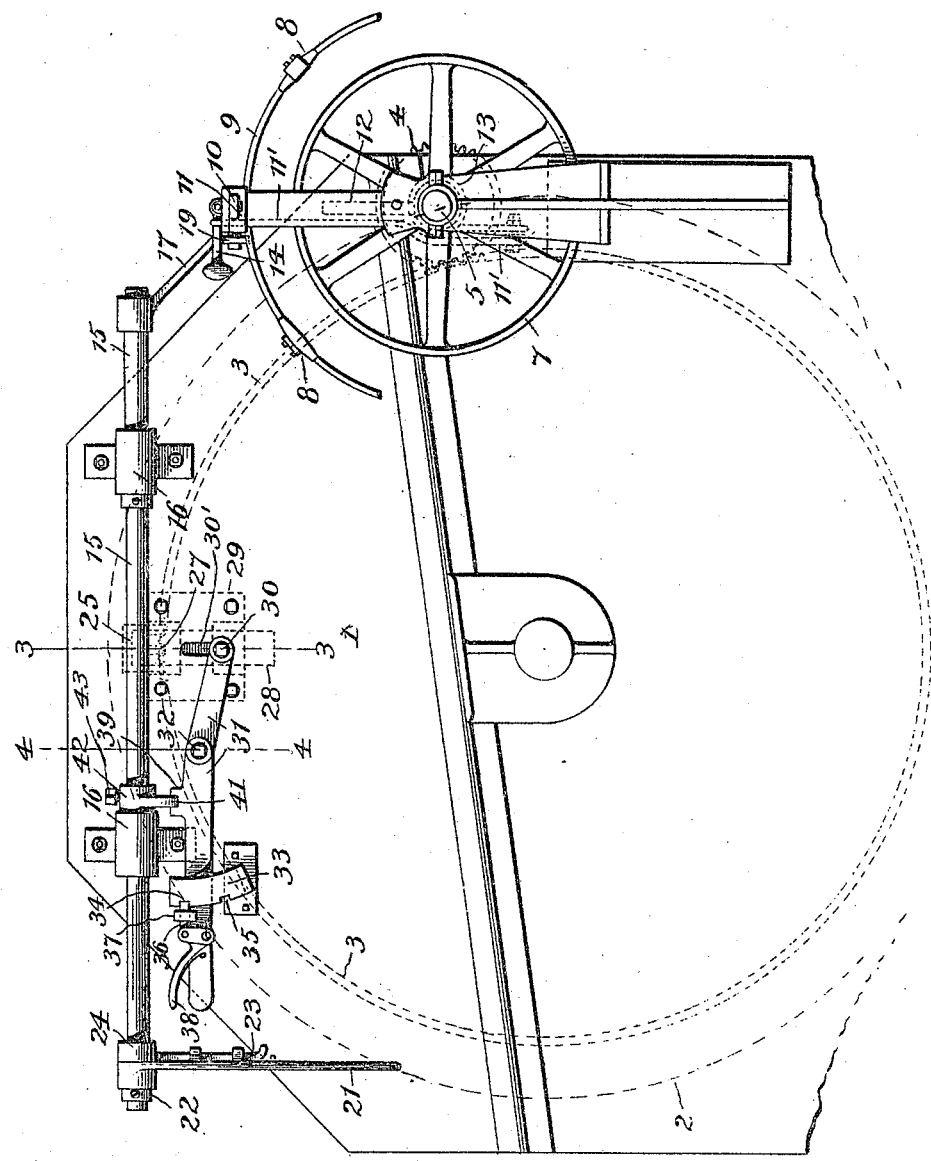

T. ALLSOP & W. W. SIBSON.
COMBINED BELT SHIFTER AND GEAR STOP.
APPLICATION FILED JUNE 30, 1908.

948,948.

Patented Feb. 8, 1910.
2 SHEETS—SHEET 1.

Witnesses:
Jas E Hutchinson
Nettie E Smith

Inventors
Thomas Allsop
Walter W Sibson
By
Attorney

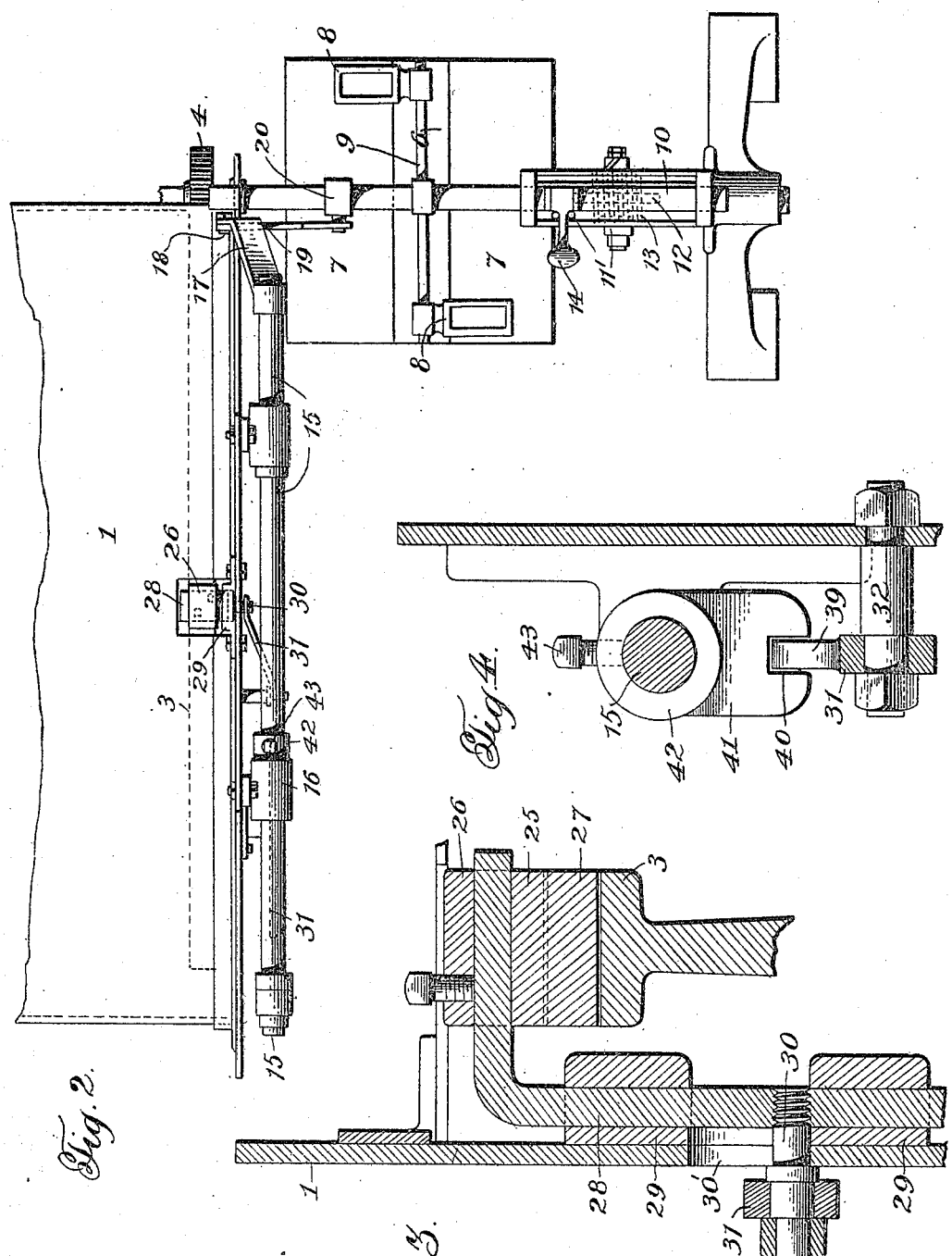

UNITED STATES PATENT OFFICE.

THOMAS ALLSOP AND WALTER W. SIBSON, OF PHILADELPHIA, PENNSYLVANIA, ASSIGNORS TO THE PHILADELPHIA DRYING MACHINERY COMPANY, OF PHILADELPHIA, PENNSYLVANIA, A CORPORATION OF PENNSYLVANIA.

COMBINED BELT-SHIFTER AND GEAR-STOP.

948,948.  Specification of Letters Patent.  Patented Feb. 8, 1910.

Original application filed November 12, 1907, Serial No. 401,888. Divided and this application filed June 30, 1908. Serial No. 441,113.

*To all whom it may concern:*

Be it known that we, THOMAS ALLSOP and WALTER W. SIBSON, citizens of the United States, residing at Philadelphia, in the county of Philadelphia and State of Pennsylvania, have invented certain new and useful Improvements in Combined Belt-Shifters and Gear-Stops; and we do hereby declare the following to be a full, clear, and exact description of the invention, such as will enable others skilled in the art to which it appertains to make and use the same.

This invention relates to improvements in combined belt shifters and gear stops, and is especially related to devices of this character for use in connection with dyeing machines of the type covered by our pending application for patent Serial No. 401,888, filed November 12, 1907.

In the machine covered by the application referred to the proper positioning of the internal drum of the vat can be effected only by the operative leaving the front of the machine to manipulate by hand the belt shifting mechanism at the rear thereof. This requires not only unnecessary loss of time on the part of the operative, but also places the latter in a position where it is impossible to determine the exact movement of the internal drum, and it is, therefore, with difficulty that the latter can be positioned for the introduction and removal of the drain boards employed in connection with the internal drum. Furthermore, it is impossible to lock from the front of the machine the belt shifter mechanism, covered by the apparatus referred to, against possible operation when the machine is at rest. Thus the belt shifting mechanism may cause the machine to start up during the period the internal drum is being unloaded, with possible injury to the operative and damage to the machine.

It is, therefore, the object of the present invention to provide a combined belt shifter and gear stop by means of which the operative, while occupying a position at the front of the machine, may readily manipulate the power belts in order to properly position the internal drum of the vat, and also by which the drum may be locked against movement while at rest, the locking means being so related to the belt shifting means as also to lock the latter against movement until it is desired to shift the power belts for actuating the internal drum. The locking means, therefore, are so related to the belt shifter as to preclude possibility of the belts being shifted until the operative is prepared to start the machine, and at the same time the internal drum is also locked against movement, the release of the internal drum being first necessary before it is possible to shift the belts.

With these objects in view, and others that will appear as the nature of the improvements is better understood, the invention consists substantially in the novel construction, combination and arrangement of parts hereinafter fully described, illustrated in the accompanying drawings and pointed out in the appended claims.

In the drawings—Figure 1 is an end elevation of a dyeing machine equipped with a combined belt shifter and gear stop constructed in accordance with the present invention. Fig. 2 is a top plan view thereof, the dye vat being broken away. Fig. 3 is a transverse sectional view on the line 3—3, Fig. 1. Fig. 4 is a similar view on the line 4—4, Fig. 1.

Referring in detail to the drawings, the numeral 1 designates the vat of a dyeing machine of the type covered by our former application for patent, hereinbefore specifically referred to, within which vat is an internal drum 2 for receiving the articles to be dyed. This internal drum has rotary movement within the vat 1, this movement being imparted to the drum through the medium of a gear 3 that is suitably connected thereto. As clearly disclosed in our previous application, one of these gears 3 is carried by the drum 2 at each of its ends. In order that the gear 3 may be properly actuated a pinion 4, carried by a driving shaft 5, meshes with the gear 3, the shaft 5 having intermittent movement in reverse directions. For accomplishing this a pulley 6 is fastened tight upon the shaft 5, so that the latter rotates with said pulley, and arranged at the sides of the pulley 6 are loose pulleys 7 upon each of which a separate belt (not shown) is designed to travel. These belts move in opposite directions to each other, and each is received by a belt guide 8, said guides being mounted upon a supporting rod 9, which rod, in turn, is carried by a shifter bar 10. The shifter bar 10 is mounted to reciprocate in a guide 11, the bar 10 receiving its reciprocation from a lever 11' that is caused to move to and fro through the medium of a worm wheel 12 that is actuated by a worm 13 carried by the shaft 5. The bar 10 has a detachable connection with the lever 11 by means of a latch 14.

All of the preceding construction is fully described and shown in our previous application Serial No. 401,888, and it is, therefore, unnecessary to enter into further detailed description thereof.

As before stated, the present invention relates primarily to a combined device for shifting the belts and locking the gear against rotation, this device being of such form as to permit this being accomplished from the front of the machine, and thereby obviating the necessity of the machine operative leaving his post at the front of the machine. To the accomplishment of this end, an operating shaft 15 is arranged upon that end of the machine whereat the pulleys 6 and 7 are located, this shaft being journaled in suitable bearings 16 that are fixedly connected to the machine frame. This shaft extends transversely of the machine frame, and at the rear end is provided with a depending crank 17 to which is pivotally connected, as at 18, a link 19, the latter being pivoted to a sleeve 20 that is carried upon the inner end of the shifter bar 10. A handle 21 is loosely mounted upon the forward end of the shaft 15, being held thereon by a collar 22, and said handle 21 is provided with a bolt 23, which may be spring-actuated, by means of which the handle 21 is locked into fixed relation with said shaft. This is effected by the bolt 23 engaging a socket in a collar 24 that is fixedly connected to the shaft 15. It is thus clear that when the handle 21 is fixedly connected to the shaft 15, the latter may be rotated in its bearings 16, and through such movement the bar 10 may be shifted in its guide, the crank 17 and link 19 causing this movement of the bar 10.

In order to prevent movement of the internal drum, and to hold the gear 3 in its position of rest, a gear stop 25 is employed. This stop comprises a sleeve 26 from which depend a series of teeth 27 designed to interlock with the teeth of the gear 3, said sleeve being carried by the horizontal member of a slide bar 28 of inverted L-shape. The vertical member of this slide bar is mounted in a guide plate 29 that is affixed to the inner side of the end of the machine, and said vertical member is provided with a stud 30 that projects through an elongated slot 30' that is formed in the machine end. Thus the stud 30 projects at the exterior of the machine, at a point below the operating shaft 15, and is connected to one end of an operating lever 31 that is pivoted at 32 at the exterior of the machine end. This operating lever 31 works within a segmental guide 33, the latter being connected to the exterior of the end of the machine, and having formed therein upper and lower notches 34 and 35, respectively, and said lever 31 carries a locking pin 36 designed to engage the notches 34 and 35. This pin 36 slides within a guide loop 37, the pin 36 being connected to a spring pressed handle grip 38 which is pivotally connected to the forward end of the operating lever 31. It will thus be seen that through the medium of the pin 36 the lever 31 is locked into engagement with the guide 33 at both limits of its movement. When engaged with the upper notch 34, it is obvious that the gear stop will be in engagement with the teeth of the gear 3, and when in engagement with the notch 35 the gear stop will be raised from the teeth of the gear 3, and the latter free to operate.

The lever 31 coöperates with the shaft 15 to lock the latter against rotation, and to thus prevent accidental shifting of the belts, and for this purpose the lever 31, at a point contiguous to the pivot 32, is provided with an upwardly-extending lug 39, which lug is received by a notch 40 in a depending locking finger 41. This finger is carried by a sleeve 42 mounted upon the shaft 15, adjacent to the forward bearing 16, and said sleeve is held thereon by a set screw 43. When the notch 40 is in alinement with the lug 39, and the lever 31 is at the upper limit of its movement, said lug 39 fits within said notch. The finger 41, therefore, straddles the lug 39, and in this position effectually prevents the shaft 15 rotating in its bearings. When in this locked engagement, the shifter bar 10 has been moved to such position that the belt guides 8 are over the loose pulleys 7, and thus these belts apply no power to the tight pulley 6.

In the use of the herein described invention, and when the internal drum 2 is under operation, the operating lever 31 is in its lowermost position, or that wherein the pin 36 is in engagement with the notch 35. As before stated, this position of the operating lever causes the gear stop to be freed from engagement with the teeth of the gear 3.

When the dyeing operation has been completed, and it is desired to remove the goods from the drum 2, the operative releases the latch 14 from the lever 11, and thus disconnects the shifter bar therefrom. If the drum 2 has not come to rest at the proper point to permit introduction of the drain boards thereto, the handle 21 is locked into engagement with the shaft 15, and by properly manipulating the handle 21 the operative may shift the belts from the front of the machine, and apply sufficient power to the internal drum 2 to bring the latter to its proper position. When this has been accomplished, the bar 10 is operated sufficiently to position the belts upon the loose pulleys 7, to prevent further movement of the internal drum 2. Pressure is then applied to the handle grip 38, to release the pin 36 from the lower notch 35, and when this has been done the operating lever 31 is swung upon its pivot to the limit of its upward movement, whereupon the teeth 27 of the gear stop descend into engagement with the teeth of the gear 3, thus locking the latter against movement. At the same time that this is accomplished, the lug 39 has moved into engagement with the slot 40 of the finger 41, and this locks the shaft 15 against rotation in its bearings, so that the gear 3 is not only locked against movement, but the belt shifting mechanism is also prevented from moving. Hence, the belts will remain upon the loose pulleys 7, and their accidental application to the tight pulley 6 is entirely obviated. When it is desired to again start the machine, the operating lever 31 is moved to its lowermost position, this movement bringing the lug 39 from the notch of the finger 41, and at the same time raising the gear stop. The shaft 15 is now free to be operated, and when the latch 14 has been engaged with the lever 11, the drum 2 will intermittently rotate in opposite directions until it is again desired to bring the drum to rest.

Having thus described the invention, what is claimed as new, and desired to be secured by Letters Patent, is:

1. In a device of the class described, a shaft, belt shifting means associated therewith, means movable relatively to said shaft to interlock with the latter and prevent movement thereof, and gear-locking means associated with said interlocking means.

2. In a device of the class described, a shaft, belt shifting means associated therewith, means movable relatively to said shaft to interlock with the latter and prevent movement thereof, and gear-locking means associated with said interlocking means, said interlocking means and gear locking means having simultaneous movement to effect the locking and unlocking action.

3. In a device of the class described, a shaft, belt shifting means associated therewith, an operating lever movable relatively to said shaft to interlock with the latter and prevent movement thereof, and gear-locking means actuated by said lever.

4. In a device of the class described, a shaft, belt shifting means associated therewith, an operating lever movable relatively to said shaft to interlock with the latter and prevent movement thereof, and a slidable gear stop actuated by said lever.

5. In a device of the class described, a shaft, belt shifting means associated therewith, an operating lever movable relatively to said shaft, a locking finger carried by the shaft and with which said operating lever engages to prevent movement of the shaft, and gear-locking means associated with said lever.

6. In a device of the class described, a shaft, belt shifting means associated therewith, an operating lever movable relatively to said shaft, a locking finger carried by the shaft and with which said operating lever engages to prevent movement of the shaft, and a slidable gear stop actuated by said lever.

7. In a device of the class described, a shaft, belt shifting means associated therewith, an operating lever movable relatively to said shaft, a locking finger carried by the shaft and with which said operating lever engages to prevent movement of the shaft, and a slidable gear stop actuated by said lever, said lever and gear stop having simultaneous movement in effecting the locking and unlocking action.

8. In a device of the class described, a shaft, belt shifting means associated therewith, an operating lever movable relatively to said shaft to interlock with the latter and prevent movement thereof, and means for locking said operating lever at the limits of its movement.

9. In a device of the class described, a shaft, belt shifting means associated therewith, an operating lever movable relatively to said shaft to interlock with the latter and prevent movement thereof, gear-locking means associated with said lever, and means for locking said operating lever at the limits of its movement.

10. In a device of the class described, a shaft, belt shifting means associated therewith, an operating lever movable relatively to said shaft to interlock with the latter and prevent movement thereof, a guide in relation to which said lever works, and means for locking the lever in relation to said guide at the limits of the movement of said lever.

11. In a device of the class described, a shaft, belt shifting means associated therewith, an operating lever movable relatively to said shaft to interlock with the latter and prevent movement thereof, a guide in relation to which said lever works, gear-locking means associated with said lever, and means for locking the lever in relation to said guide at the limits of the movement of said lever.

12. In a device of the class described, a shaft, belt shifting means associated therewith, an operating lever movable relatively to said shaft to interlock with the latter and prevent movement thereof, a guide in relation to which said lever works, a slidable gear stop associated with said lever, and
5 means for locking the lever in relation to said guide at the limits of the movement of said lever.

In testimony whereof we affix our signatures, in the presence of two witnesses.

THOMAS ALLSOP.
WALTER W. SIBSON.

Witnesses:
RALPH M. ERWIN,
HARRY L. FENTON.